US007524148B2

(12) United States Patent
Okita et al.

(10) Patent No.: US 7,524,148 B2
(45) Date of Patent: Apr. 28, 2009

(54) INDEXABLE INSERT

(75) Inventors: Yasuhiko Okita, Itami (JP); Yasuyuki Kanada, Itami (JP); Tomohiro Fukaya, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 153 days.

(21) Appl. No.: 10/586,342

(22) PCT Filed: Dec. 24, 2004

(86) PCT No.: PCT/JP2004/019341

§ 371 (c)(1), (2), (4) Date: Jul. 14, 2006

(87) PCT Pub. No.: WO2005/068117

PCT Pub. Date: Jul. 28, 2005

(65) Prior Publication Data

US 2007/0116531 A1 May 24, 2007

(30) Foreign Application Priority Data

Jan. 14, 2004 (JP) ............................ 2004-006813

(51) Int. Cl.
*B23B 27/22* (2006.01)
*B23B 27/14* (2006.01)

(52) U.S. Cl. ...................................... 407/114; 407/115

(58) Field of Classification Search ......... 407/113–116, 407/118, 119
See application file for complete search history.

(56) References Cited

U.S. PATENT DOCUMENTS 4,359,300 A * 11/1982 Hazra et al. ................. 407/114
4,720,217 A * 1/1988 Bonjour et al. ............. 407/114
5,044,839 A * 9/1991 Takahashi ................... 407/114
5,226,761 A * 7/1993 Satran et al. ................ 407/114
5,249,894 A * 10/1993 Bernadic et al. ............ 407/114
5,456,557 A 10/1995 Bernadic et al.
5,584,616 A 12/1996 Katbi et al.
5,707,185 A * 1/1998 Mizutani ..................... 407/42

(Continued)

FOREIGN PATENT DOCUMENTS

EP 0 418 619 A1 3/1991

(Continued)

*Primary Examiner*—Boyer D Ashley
*Assistant Examiner*—Sara Addisu
(74) *Attorney, Agent, or Firm*—McDermott Will & Emery LLP

(57) ABSTRACT

A superhard sintered body containing cubic boron nitride is bonded to an apical angle part of a tool body having a polygonal shape, and an edge and a chip breaker are formed on the superhard sintered body. A chamfer is formed on the intersection between the upper surface and the side surface of the superhard sintered body, the chip breaker has a protrusion, and an angle θ formed by ridges on the apex of the protrusion or a tangential line at a point bisecting the ridges and a bisector for the apical angle and the ratio of the distance between a first intersection between the two ridges on the apex of the protrusion and an extreme point of the first ridge to the distance between a second intersection between a straight line passing through the first intersection and the extreme point and the outer periphery of the tool body and the first intersection are in prescribed ranges.

9 Claims, 3 Drawing Sheets

T
6c
9a
α
L1'
P
θ
6
6b
6a
B
L1
S
7a
9
8
L2
Q
7
5

T
6c
9a
α
L1'
P
θ
6d
6a
6b
6
S
L1
9
7
8
L2
Q

U.S. PATENT DOCUMENTS

| | | | | |
|---|---|---|---|---|
| 5,876,160 | A * | 3/1999 | Johnson | 409/132 |
| 5,947,651 | A * | 9/1999 | Murakami et al. | 407/114 |
| 6,612,786 | B1 * | 9/2003 | Kanada et al. | 407/118 |
| 6,655,881 | B2 * | 12/2003 | Shimizu | 407/113 |
| 2003/0063955 | A1 * | 4/2003 | De Beaupre et al. | 407/119 |
| 2004/0228694 | A1 * | 11/2004 | Webb et al. | 407/113 |

FOREIGN PATENT DOCUMENTS

| | | | | |
|---|---|---|---|---|
| EP | 0 703 032 | A1 | | 3/1996 |
| EP | 1 122 010 | A1 | | 8/2001 |
| JP | 4-217404 | A | | 8/1992 |
| JP | 4-217405 | A | | 8/1992 |
| JP | 4-217406 | A | | 8/1992 |
| JP | 4-217407 | A | | 8/1992 |
| JP | 4-217408 | A | | 8/1992 |
| JP | 4-217409 | A | | 8/1992 |
| JP | 5-12007 | | | 2/1993 |
| JP | 8-52604 | A | | 2/1996 |
| JP | 8-52605 | A | | 2/1996 |
| JP | 8-155702 | A | | 6/1996 |
| JP | 2003-175408 | A | | 6/2003 |
| JP | 2006095620 | A | * | 4/2006 |
| JP | 2008200831 | A | * | 9/2008 |

* cited by examiner

INDEXABLE INSERT

RELATED APPLICATIONS

This application is the U.S. National Phase under 35 U.S.C. § 371 of International Application No. PCT/JP2004/019341, filed on Dec. 24, 2004, which in turn claims the benefit of Japanese Application No. 2004-006813, filed on Jan. 14, 2004, the disclosures of which Applications are incorporated by reference herein.

TECHNICAL FIELD

The present invention relates to an indexable insert having excellent chip treatability, prepared by bonding a cutting edge consisting of a superhard sintered body containing cubic boron nitride to an apical angle part of a tool body.

BACKGROUND ART

A cutting tool of a cubic boron nitride sintered body having a cutting edge prepared by sintering fine cubic boron nitride powder with a binder exhibits excellent performance with respect to cutting of a hard iron group or cast iron.

Following automation of a machine tool or introduction of unmanned operation into a production process, improvement of chip treatability has recently been required as an item necessary and essential for continuous running along with long-livedness of a cutting tool. However, a conventional cutting tool of a cubic boron nitride sintered body is hardly provided with a chip breaker for parting chips, and hence abnormal detachment of a work or the tool or deterioration of the work surface so easily results from involution of chips during automatic operation of a machine tool that the automatic operation may be rendered impossible to inhibit improvement of productivity.

On the other hand, each of Japanese Patent Laying-Open Nos. 8-155702, 4-217404 to 4-217409 and 8-52605 discloses a cutting tool of a hard sintered body having a chip breaker. The cutting tool described in this literature is provided with a single- or multi-start linear breaker shape for spirally curling chips due to this shape and enabling chip treatment.

However, the cutting tool provided with the chip breaker having such a simple shape disadvantageously requires a tool provided with different right and left hands depending on tooling, a tool provided with a breaker suitable to each of outer diameter working and end face working, a tool provided with a breaker corresponding to each of cutting conditions having different feed rates or depths of cut.

Particularly in working (carburized layer removal) for cutting hardened steel by about 0.3 to 0.7 mm at a time for removing a carburized layer, hardness of the work remarkably varies with the depth of cut, to result in variation in chip outflow direction and chip treatability. This carburized layer removal requires a tool provided with a breaker responsive to the hardness of the work. In other words, the conventional tool provided with a breaker attains the effect of chip treatment only under specific cutting conditions and is unapplicable to wide-ranging working conditions, and hence a plurality of tools are disadvantageously required in response to various tooling conditions.

In the cutting tool described in each of Japanese Patent Laying-Open Nos. 4-217404 to 4-217409, the surface roughness of the upper surface of the superhard sintered body having the chip breaker is set to at least 0.5 S and not more than 10 S or the like, in order to easily curl chips. When the cutting tool is employed for cutting a hard work such as hardened steel in particular, however, chips are so hard that frictional resistance is increased due to the chips and a rake face of the tool is easily damaged by heat resulting from rubbing if the surface roughness of the superhard sintered body is in excess of 0.5 S. Consequently, the shape of the tool is disadvantageously changed due to progress of crater wear, to reduce the chip treatability.

Japanese Patent Laying-Open No. 8-52605 discloses a cutting tool provided with a chip breaker and a rake face having a cutting face formed at a positive shear angle. In this cutting tool, however, the strength of a cutting edge is so insufficient for stable cutting that an edge frequently causes tool failure during cutting when the cutting tool is employed for cutting a hard work such as hardened steel.

Patent Literature 1: Japanese Patent Laying-Open No. 8-155702

Patent Literature 2: Japanese Patent Laying-Open No. 4-217404

Patent Literature 3: Japanese Patent Laying-Open No. 4-217405

Patent Literature 4: Japanese Patent Laying-Open No. 4-217406

Patent Literature 5: Japanese Patent Laying-Open No. 4-217407

Patent Literature 6: Japanese Patent Laying-Open No. 4-217408

Patent Literature 7: Japanese Patent Laying-Open No. 4-217409

Patent Literature 8: Japanese Patent Laying-Open No. 8-52605

DISCLOSURE OF THE INVENTION

Problems to be Solved by the Invention

The present invention has been proposed in order to solve the aforementioned problems of the prior art, and an object thereof is to provide an indexable insert excellent in chip treatability over wide-ranging working conditions and applicable to large change of the hardness of a work in carburized layer removal particularly in hardened steel cutting with a long-lived chip treatment effect.

Means for Solving the Problems

The indexable insert according to the present invention is prepared by bonding a superhard sintered body containing cubic boron nitride to at least the upper surface of an apical angle part of a tool body having a polygonal shape in top view and forming an edge and a chip breaker on the superhard sintered body. A chamfer is formed on the intersection between the upper surface and the side surface of the superhard sintered body. The chip breaker has a substantially symmetrical shape with respect to a section bisecting the apical angle of the apical angle part, and has a protrusion and a flat part (land) provided between the protrusion and the apical angle part. A pair of ridges on the apex of the protrusion are linear or arcuate. θ is in the range of $6/10\times\alpha \leqq \theta \leqq 90-1/10\times\alpha$ assuming that θ represents an angle formed by the linear ridges of the protrusion or a tangential line for the arcuate ridges at a point bisecting the arcuate ridges of the protrusion and a bisector for the apical angle and α represents the apical angle, while a line segmental ratio is in the range of $0.9 \leqq L1'/L1 \leqq 1.1$ assuming that L1 represents the length of a line segment connecting a first intersection between the pair of ridges on the apex of the protrusion and an extreme point of the first ridge and L1' represents the length of a line segment connecting an extreme point of the second ridge and the first intersection, and $0.2 \leqq L1/L2 \leqq 0.8$ assuming that L2 represents the length of a line segment connecting a second intersection between a straight line passing through the extreme point of the first ridge from the first intersection and the outer periphery of the tool body and the first intersection.

The indexable insert exhibits an excellent chip treatment effect with respect to wide-ranging cutting conditions due to the aforementioned structure. Consequently, the problems of the requirement for a tool provided with different right and left hands depending on tooling, the requirement for cutting tools suitable to outer diameter working and end face working respectively, the requirement for cutting tools corresponding to respective cutting conditions having different feed rates or depths of cut and the requirement for a plurality of cutting tools responsive to the values of hardness of works in carburized layer removal in hardened steel cutting or the like are solved.

The tool body of the indexable insert according to the present invention, having the polygonal shape in top view when observed from above, is generally prepared from that having a triangular or rectangular shape in top view. In the tool body of the indexable insert according to the present invention, the superhard sintered body containing cubic boron nitride is bonded to at least the upper surface of the apical angle part of this polygonal tool body. The superhard sintered body is prepared by sintering powder of cubic boron nitride, preferably contains at least 20 percent by volume of cubic boron nitride, and is more preferably mainly composed of cubic boron nitride contained by at least 40 percent by volume in general.

While the forward end (nose) of the apical angle part of the polygonal tool body functions as an edge, this part is generally arcuate and provided with a nose R. The superhard sintered body further has a chip breaker in order to treat chips.

In the indexable insert according to the present invention, the chamfer (hereinafter referred to as a negative land) is formed on the intersection between the upper surface and the side surface of the superhard sintered body. The negative land is so formed as to increase the strength of a cutting edge and improve the life of the indexable insert. The negative land, formed on at least the superhard sintered body part in order to improve the strength of the cutting edge, may alternatively be formed on the tool body unless chip treatability is damaged.

The chip breaker has the protrusion, while the flat part (land, hereinafter referred to as a land part) is formed between the protrusion and the edge. The protrusion consists of an inclined surface having a shape protruding toward the edge, retracting from the edge toward the outer periphery (edges of the polygon in top view) of the indexable insert and moving up as separating from the edge and an apical surface of the protrusion. As hereinabove described, the ridges formed by the inclined surface and the apical surface are linear or arcuate in the indexable insert according to the present invention.

The indexable insert according to the present invention is characterized in that the aforementioned θ as well as L1'/L1 and L1/L2 are within the aforementioned ranges. When the indexable insert is employed for cutting at a large feed rate or depth of cut for outer diameter working on a hard material, particularly hardened steel, remarkably varied in hardness due to carburized layer removal, a chip outflow direction may not be stabilized but chips may deviate from the center of the nose R on the forward end of the apical angle part to flow out toward the outer periphery of the tool body, and the chip outflow direction tends to be instable particularly when the work has low hardness. In end face working, on the other hand, chips may deviate from the center of the nose R to flow out toward the outer periphery of the tool body. However, these problems can be solved by setting θ as well as L1'/L1 and L1/L2 in the aforementioned ranges.

If θ is less than $6/10\times\alpha$, chips flowing out toward the central portion of the protrusion collide with the forward end of the protrusion to result in frequent tool failure of the central portion of the protrusion during outer diameter working of hardened steel, particularly in carburized layer removal. Particularly when the indexable insert is employed for carburized layer removal of hardened steel at a large depth of cut or feed rate, such tool failure easily results from chips having large thicknesses. If the feed rate is large in end face working, the chip outflow direction tends to deviate from the center of the nose R toward the outer periphery of the protrusion, while the distances between the protrusion located on the outer periphery and chips colliding therewith are so increased that it is difficult to curl the chips if θ is less than $6/10\times\alpha$.

If θ exceeds $90-1/10\times\alpha$, chips flow out in a clogging manner under working conditions with a large feed rate or depth of cut to pile up on the protrusion to result in formation of large-diametral curled chips, and it is consequently difficult for the indexable insert to exhibit the chip treatment effect. Also in end face working, chips so easily clog similarly to those in outer diameter working that it is difficult for the indexable insert to exhibit the chip treatment effect.

While the indexable insert is also employed for cutting a work having low hardness in carburized layer removal, the work (chips) easily adheres to the land part or the protrusion if chips flow out in a clogging manner in this case, to result in tool failure of the edge and the chip breaker part during cutting and remarkably reduce the tool life. If θ exceeds $90-1/10\times\alpha$, the protrusion so slightly protrudes toward the nose R that the shape of the protrusion approaches a single-start linear shape and hence the indexable insert is reduced in chip treatability and cannot be applied to wide-ranging working conditions when the feed rate or the depth of cut is small.

If the value of L1'/L1 is less than 0.9 or in excess of 1.1, the hand shape is so strengthened that it is difficult to curl the chips both in outer diameter working and end face working and the indexable insert cannot be applied to various tooling conditions. If L1/L2 is less than 0.2, further, chips deviating from the center of the nose R and flowing out toward the outer periphery of the tool body hardly collide with the protrusion and hence it is difficult to curl the chips. Particularly when the feed rate or the depth of cut is large in outer diameter working, the chip outflow direction is destabilized to easily result in this problem. Also in end face working, chips hardly collide with the protrusion similarly to those in outer diameter working and it is difficult to form chips having proper curl diameters.

If L1/L2 exceeds 0.8, on the other hand, the protrusion extends toward a portion close to the outer periphery of the tool body and hence chips easily pile up on the protrusion to disadvantageously result in discharge of large-diametral curled chips and reduce the chip treatability. This tendency is increased particularly under working conditions with a large feed rate or depth of cut. When chips colliding with the protrusion are curled and discharged, chip dischargeability is reduced on the outer periphery of the protrusion to easily cause chip clogging. Further, the protrusion may cause tool failure due to a load resulting from chip clogging.

In addition to the aforementioned structure, the present invention also provides the following structures as more preferable modes. At least two of the following structures may be properly combined with each other.

In the indexable insert according to the present invention, the surface roughness of the land part of the superhard sintered body and the chamfer adjacent to the land part is preferably at least 0.1 μm and less than 0.5 μm in ten point height of irregularities (Rz JIS 94). The term "surface roughness" denotes a value measured according to Rz JIS 94 defined under JIS.

When the surface roughness of the land part of the superhard sintered body is set to less than 0.5 μm, frictional resistance caused by chips is reduced, heat generation caused by rubbing can be suppressed and the degree of damage on a rake face of the tool can be reduced. Consequently, shape change of the tool resulting from progress of crater wear can be suppressed and excellent chip treatability in the initial stage of working is maintained also when the cutting length is increased. On the other hand, preparation of a tool having surface roughness of less than 0.1 μm requires remarkable labor, and hence the surface roughness is preferably at least 0.1 μm in an economical point of view.

In the indexable insert according to the present invention, an angle (negative land angle) formed by the negative land and the upper surface of the tool body is preferably in the range of at least 15° and not more than 45°. When the negative land angle is set in this range, the strength of the cutting edge is so improved that the cutting edge is inhibited from tool failure resulting from a working load during cutting, and a stable working size can be obtained.

In the indexable insert according to the present invention, further, the width (negative land width) of the negative land on the forward end of the apical angle is preferably in the range of at least 0.02 mm and not more than 0.2 mm in top view. When the negative land width is at least 0.02 mm on the forward end of the apical angle, an effect of reinforcing the cutting edge is so improved that it is possible to remarkably suppress the frequency of tool failure on the edge during cutting. When the negative land width is not more than 0.2 mm, on the other hand, an excellent effect of chip treatability can be maintained also when the shape of the tool is changed due to progress of crater wear.

In the indexable insert according to the present invention, further, the distance between the forward end (corresponding to the nose R when the indexable insert has the nose R) of the apical angle and the first intersection (P) is preferably in the range of at least 0.1 mm and not more than 2 mm in top view. When the distance between the forward end of the apical angle and the first intersection (P) is set in this range, a proper breaker width and a proper breaker height are obtained for attaining excellent chip treatability. More specifically, this distance is so set to at least 0.1 mm that heat generation resulting from rubbing can be reduced when chips collide with the land part and the protrusion and the indexable insert can exhibit excellent chip treatability also when the shape of the tool is changed due to progress of crater wear. On the other hand, the distance is so set to not more than 2 mm that chips collide with the protrusion, the chips can be sufficiently distorted and the indexable insert can obtain a long-term chip treatment effect also when the shape of the tool is changed due to progress of crater wear and the chips flow out upward toward the land part.

In the indexable insert according to the present invention, further, the difference between the heights of the forward end of the apical angle and the first intersection (P) is preferably in the range of at least 0.02 mm and not more than 0.5 mm. When this difference between the heights is at least 0.02 mm, the indexable insert can exhibit an excellent chip treatment effect also when the work distance is increased and crater wear progresses to change the shape of the tool. When the difference is in excess of 0.5 mm, labor for preparing the indexable insert is remarkably increased while the chip treatability remains substantially equivalent, and hence the difference is preferably set to not more than 0.5 mm in an economical point of view.

In the indexable insert according to the present invention, further, the shear angle of the land part is preferably 0°. The land part between the protrusion and the edge is shaped with no positive shear angle so that the cutting edge is sufficiently strong for cutting a hard material such as hardened steel. Further, the frequency of tool failure on the edge during cutting can be suppressed and the tool life can be improved.

In the indexable insert according to the present invention, further, a coating layer consisting of at least one element selected from a group consisting of the elements belonging to the groups 4$a$, 5$a$ and 6$a$ of the periodic table, Al, Si and B, a nitride, a carbide or an oxide of at least one metal selected from the group or a solid solution thereof is preferably formed on the surface of the superhard sintered body. When the aforementioned coating layer is formed on the surface of the superhard sintered body, wear resistance of the indexable insert serving as a cutting tool is remarkably improved, heat generation resulting from rubbing can be suppressed, and shape change of the tool resulting from progress of crater wear can be suppressed. Further, the tool life is improved and high sustained chip treatability can be obtained.

Further, the surface roughness of the flat part (land) of the superhard sintered body formed with the coating layer on the surface thereof and the chamfer adjacent to the flat part (land) is preferably at least 0.1 μm and not more than 1.0 μm in ten point height of irregularities (Rz JIS 94).

When the aforementioned film layer is formed on the surface of the superhard sintered body, the degree of damage on a tool rake face can be reduced due to the effect of the film layer excellent in heat resistance by setting the surface roughness of the film layer formed on the upper surface of the superhard sintered body to not more than 1.0 μm. Consequently, tool shape change resulting from progress of crater wear can be suppressed, and excellent chip treatability in the initial stage of working is maintained also when the cutting length is increased. On the other hand, preparation of a tool having surface roughness of less than 0.1 μm requires remarkable labor, and hence the surface roughness is preferably at least 0.1 μm in an economical point of view.

Effects of the Invention

The indexable insert according to the present invention has excellent chip controllability in cutting of a hard material, and is applicable to wide-ranging working conditions. Also when chips flow out toward the central portion or deviate from the center of the nose R and flow out toward a portion around the outer periphery of the tool to destabilize chip outflow in outer diameter working and end face working in hardened steel cutting, for example, chips collide with the inclined part of the protrusion to be curled and parted. Thus, the indexable insert according to the present invention is also applicable to a case requiring high chip treatability, and can have a long-lived chip treatment effect. Also in cutting for carburized layer removal with extreme variation of the hardness of the work, further, the inventive indexable insert can have a long-term chip treatment effect and is applicable to wide-ranging working conditions, for solving the problems of the prior art requiring a plurality of cutting tools every tooling. In particular, the inventive indexable insert improving the surface roughness of the land part can maintain superior chip treatability, to attain a longer tool life. In addition, effective utilization of the same insert, change of feed conditions with no insert exchange etc. are further simplified.

DESCRIPTION OF THE REFERENCE NUMERALS

1 superhard sintered body, 2 tool body, 3 cemented carbide base, 4 insert hole, 5 apical angle part, 6 protrusion, 6*a* inclined surface, 6*b* ridge, 6*c* ridge, 6*d* point bisecting arcuate ridge, 7 negative land, 7*a* width of negative land, 8 land part, 9 nose, 9*a* bisector for apical angle.

BEST MODES FOR CARRYING OUT THE INVENTION

Figure 1A:
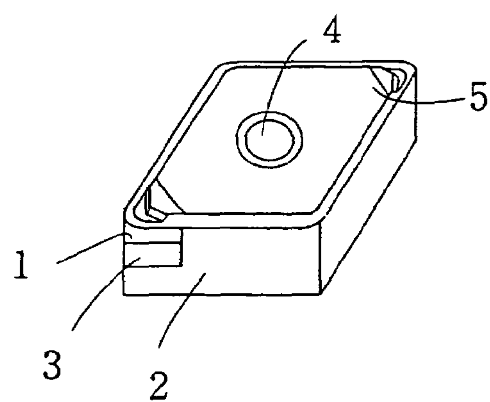
FIG. 1A is a squint figure showing an exemplary indexable insert according to the present invention.
Figure 1B:
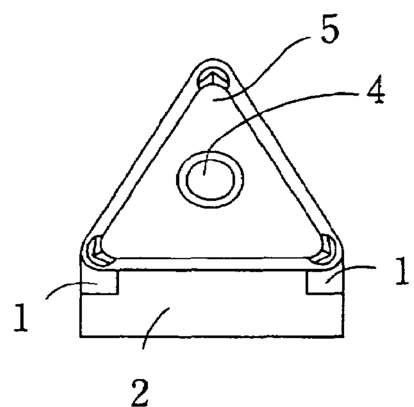
FIG. 1B is a squint figure showing another exemplary indexable insert according to the present invention.

FIGS. 1A and 1B are squint figures showing exemplary indexable inserts according to the present invention. In the example shown in FIG. 1A, a tool body 2 has a rectangular shape in top view, and a two-layer structure formed by integrating a superhard sintered body 1 containing at least 20 percent by volume of cubic boron nitride and a cemented carbide base 3 with each other is brazed to each apical angle part 5 of the tool body 2 of cemented carbide. The example of FIG. 1B shows an indexable insert formed by directly brazing a superhard sintered body 1 containing at least 20 percent by volume of cubic boron nitride to each apical angle part 5 of a tool body 2 of cemented carbide having a triangular shape in top view.

Each of these indexable inserts is mounted on a holder (not shown) through an insert hole 4, for example. The indexable insert according to this embodiment is also applicable as a cutting tool whose superhard sintered body is directly brazed to a holder. The feature of the indexable insert according to this embodiment resides in the structure of a portion around an edge corresponding to the most important part contributing to the cutting performance of a cutting tool.

Figure 2:
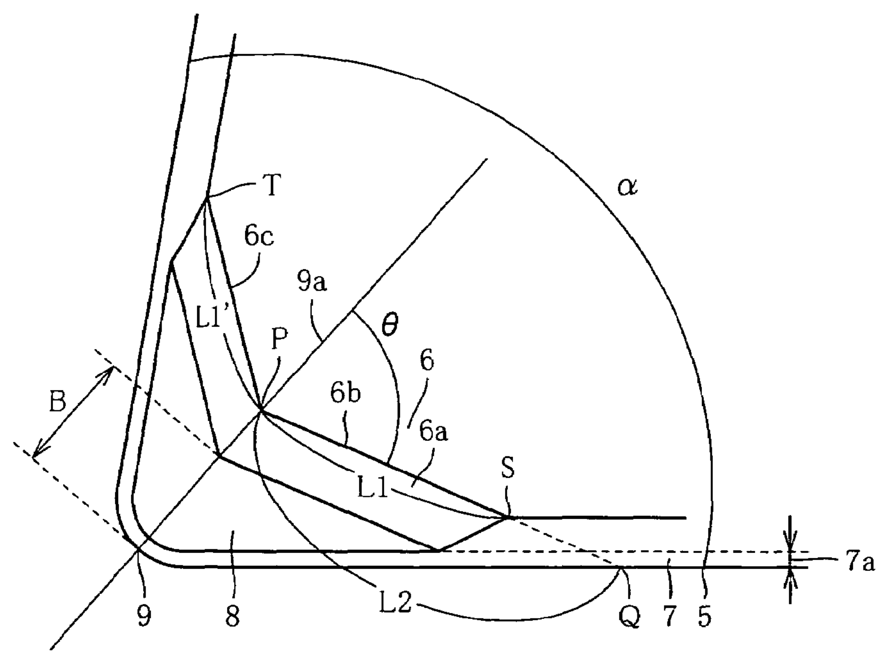
FIG. 2 is a plan figure showing the structure of a portion around an edge of the exemplary indexable insert according to the present invention.
Figure 3:
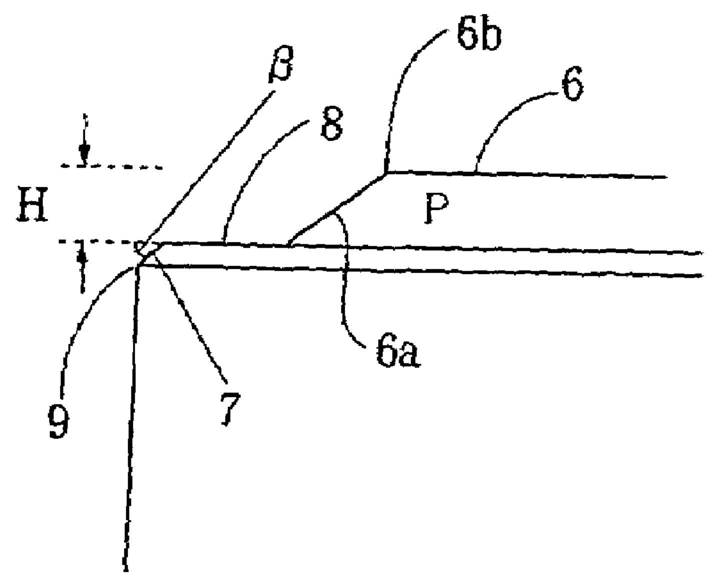
FIG. 3 is a side figure the structure of the portion around the edge of the exemplary indexable insert according to the present invention.

FIG. 2 is a plan figure showing the structure of a portion around an edge of the exemplary indexable insert according to the present invention. FIG. 3 is a side figure showing the structure of the portion around the edge of the exemplary indexable insert according to the present invention. As shown in FIGS. 2 and 3, a protrusion 6 is formed on a rake face around the edge of the indexable insert, i.e., the upper surface of the superhard sintered body 1. The protrusion 6 has an inclined surface 6*a*. Further, the protrusion 6 has a similar shape with respect to a section bisecting the apical angle of a cutting edge.

As shown in FIGS. 2 and 3, the forward end (nose 9) of an apical angle part, i.e., the cutting edge of the edge is arcuate and forms a nose R. The indexable insert has a land part 8 having a shear angle of 0° between the protrusion 6 and the nose 9 (cutting edge). The shear angle is so set to 0° as to improve the tool life.

The inclined surface 6*a* forms a ridge 6*b* and another ridge 6*c* on the apex of the protrusion, and an angle θ° formed by the ridge 6*b* and a bisector 9*a* for the apical angle (nose R) (i.e., the angle θ° formed by the ridge 6*b* and a section bisecting the apical angle) is in the range of $6/10\times\alpha \leqq \theta \leqq 90-1/10\times\alpha$ with respect to the apical angle α. Assuming that L1 represents the length of a line segment connecting the intersection (first intersection) P between the ridge 6*b* and the ridge 6*c* and an extreme point S of the ridge 6*b*, L1' represents the length of a line segment connecting the intersection P and an extreme point T of the ridge 6*c*, a line segmental ratio consisting of the ridges is in the range of $0.9 \leqq L1'/L1 \leqq 1.1$ and L2 represents the length of a line segment connecting a straight line passing through the extreme point S from the intersection P and an intersection (second intersection) Q with the outer periphery of the tool body, L1 and L2 satisfy $0.2 \leqq L1/L2 \leqq 0.8$.

The surface roughness of the land part 8 formed on the tool rake face on the upper surface of the superhard sintered body and a part of a negative land adjacent to the land part 8 is at least 0.1 μm and less than 0.5 μm, so that the indexable insert can consequently further excellently exhibit the aforementioned effect. The surface roughness, measured with a style, is according to Rz JIS 94 defined under JIS.

As shown in FIGS. 2 and 3, this indexable insert has a chamfer (negative land 7). An angle β (negative land angle) formed by the negative land 7 and the upper surface of the tool body is in the range of at least 15° and not more than 45°. The negative land width 7*a* on the forward end of the apical angle is in the range of at least 0.02 mm and not more than 0.2 mm in top view. Consequently, the cutting edge attains excellent strength.

In the indexable insert shown in FIGS. 2 and 3, the distance B (hereinafter referred to as a breaker width B) between the forward end of the apical angle (forward end of the nose) and the intersection P is in the range of at least 0.1 mm and not more than 2 mm in top view. The difference H (hereinafter referred to as a breaker height H) between the heights of the forward end of the apical angle (forward end of the nose excluding the negative land part) and the intersection P is in the range of at least 0.02 mm and not more than 0.5 mm. Consequently, the indexable insert attains superior chip treatability.

In the indexable insert shown in FIGS. 2 and 3, further, a coating layer (not shown) consisting of at least one element selected from a group consisting of the elements belonging to the groups 4*a*, 5*a* and 6*a* of the periodic table, Al, Si and B, a nitride, a carbide or an oxide of at least one metal selected from the group or a solid solution thereof is formed on the surface of the superhard sintered body 1. TiN, TiAlN or TiCN can be preferably listed specifically as the material constituting the coating layer. Consequently, the indexable insert is remarkably improved in wear resistance for serving as a cutting tool, improved in tool life and maintains high chip treatability.

The surface roughness of the land part 8 formed on the tool rake face of the superhard sintered body formed with a film on the surface thereof and a part of the negative land adjacent to the land part 8 is preferably at least 0.1 μm and not more than 1.0 μm, so that the indexable insert can consequently further exhibit the aforementioned effect.

Figure 5:
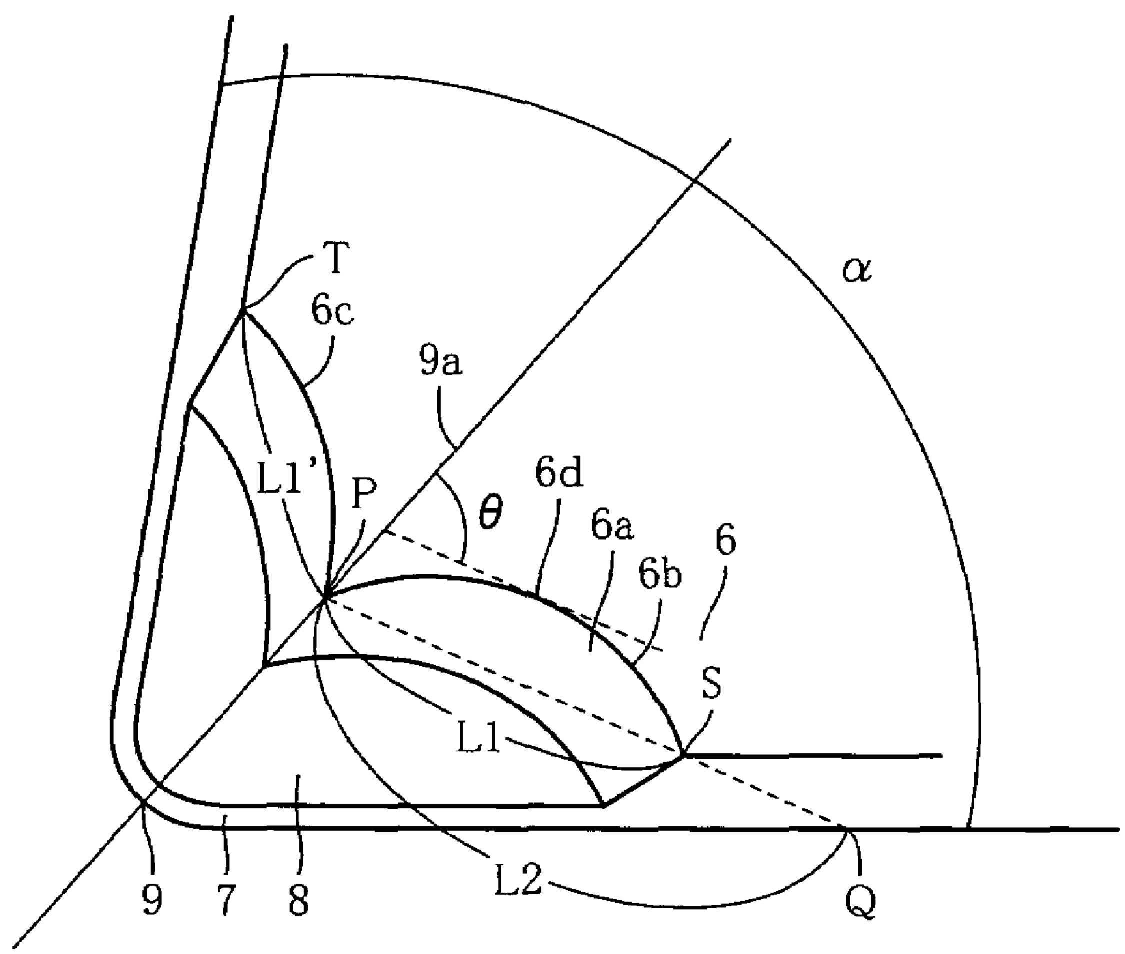
FIG. 5 is a plan figure showing the structure of a portion around an edge of still another indexable insert according to the present invention.

FIG. 5 is a plan figure showing the structure of a portion around an edge of still another indexable insert according to the present invention. While the ridge 6*b* is linear in the example shown in FIGS. 2 and 3, a ridge 6*b* is arcuate in this example shown in FIG. 5. The ridge is so rendered arcuate as to further simplify stable chip discharge when chips deviating from the center of a nose R and flowing out toward the outer periphery of a tool or unstably flowing chips collide with an inclined surface.

In this example, θ denotes an angle formed by a bisector 9*a* for an apical angle and a tangential line for this arc on a point 6*d* bisecting the arcuate ridge 6*b*. Also in this example, L1 represents the length of a line segment connecting an intersection P between the ridge 6*b* and the bisector 9*a* for the apical angle and an extreme point S of another ridge 6*a*, L1' represents the length of a line segment connecting the intersection P between the ridge 6*b* and the bisector 9*a* for the apical angle and an extreme point T of another ridge 6*c*, and L2 represents the length of a line segment connecting the intersection P and an intersection Q between a straight line passing through the extreme point S from the intersection P and the outer periphery of the tool body. The remaining points are substantially equivalent to those of the example shown in FIGS. 2 and 3, and hence redundant description is not repeated.

EXAMPLES

While the present invention is now more specifically described with reference to Examples and comparative examples, these Examples do not restrict the range of the present invention.

(1) Experimental Example 1

The following indexable inserts according to the present invention and conventional indexable inserts were employed for outer diameter working and end face working on SCM 415 carburized works while setting a cutting speed to V=120 m/min. and varying depths d of cut and feed rates f as shown in Tables 1 and 2. Chip states and chip lengths were obtained as to the respective cutting conditions, for evaluating chip treatability. Table 1 (outer diameter working) and Table 2 (end face working) show the results. The chip states are shown according to chip classification under INFOS.

Used Inserts: CNMA 120408

[Inventive Indexable Inserts]

θ=60°, L1'/L1=1, L1/L2=0.5, Rz JIS 94=0.3 μm (surface roughness of land parts and negative land parts adjacent to the land parts. This also applies to the following Experimental Examples), the negative land angle is 25°, the negative land width is 0.1 mm, the breaker width is 0.4 mm, and the breaker height is 0.25 mm.

[Comparative Indexable Inserts]

Tools provided with hands, Rz JIS 94=0.3 μm, the negative land angle is 25°, the negative land width is 0.1 mm, the breaker width is 0.4 mm, and the breaker height is 0.25 mm.

TABLE 1

Outer Diameter Working

| Run Number | Used Insert | f (mm/rev) | d (mm) | Chip State | Chip Length (cm) |
|---|---|---|---|---|---|
| A1 | Inventive Sample | 0.1 | 0.2 | Type 6 | 5 |
| A2 | Inventive Sample | 0.1 | 0.5 | Type 6 | 3 |
| A3 | Inventive Sample | 0.1 | 0.7 | Type 8 | 5 |
| A4 | Inventive Sample | 0.2 | 0.2 | Type 6 | 8 |
| A5 | Inventive Sample | 0.2 | 0.5 | Type 6 | 4 |
| A6 | Inventive Sample | 0.2 | 0.7 | Type 6 | 5 |
| A7 | Inventive Sample | 0.3 | 0.2 | Type 6 | 3 |
| A8 | Inventive Sample | 0.3 | 0.5 | Type 6 | 3 |
| A9 | Inventive Sample | 0.3 | 0.7 | Type 5 | 8 |
| A10 | Conventional Sample | 0.1 | 0.2 | Type 2 | Unparted |
| A11 | Conventional Sample | 0.1 | 0.5 | Type 2 | Unparted |
| A12 | Conventional Sample | 0.1 | 0.7 | Type 3 | Unparted |
| A13 | Conventional Sample | 0.2 | 0.2 | Type 3 | Unparted |
| A14 | Conventional Sample | 0.2 | 0.5 | Type 6 | 10 |
| A15 | Conventional Sample | 0.2 | 0.7 | Type 3 | Unparted |
| A16 | Conventional Sample | 0.3 | 0.2 | Type 3 | Unparted |
| A17 | Conventional Sample | 0.3 | 0.5 | Type 3 | Unparted |
| A18 | Conventional Sample | 0.3 | 0.7 | Type 3 | Unparted |

TABLE 2

End Face Working

| Run Number | Used Insert | f (mm/rev) | d (mm) | Chip State | Chip Length (cm) |
|---|---|---|---|---|---|
| B1 | Inventive Sample | 0.1 | 0.2 | Type 6 | 6 |
| B2 | Inventive Sample | 0.1 | 0.5 | Type 6 | 4 |
| B3 | Inventive Sample | 0.1 | 0.7 | Type 8 | 5 |
| B4 | Inventive Sample | 0.2 | 0.2 | Type 6 | 5 |
| B5 | Inventive Sample | 0.2 | 0.5 | Type 6 | 4 |
| B6 | Inventive Sample | 0.2 | 0.7 | Type 6 | 5 |
| B7 | Inventive Sample | 0.3 | 0.2 | Type 6 | 3 |
| B8 | Inventive Sample | 0.3 | 0.5 | Type 6 | 5 |
| B9 | Inventive Sample | 0.3 | 0.7 | Type 6 | 3 |
| B10 | Conventional Sample | 0.1 | 0.2 | Type 2 | Unparted |
| B11 | Conventional Sample | 0.1 | 0.5 | Type 2 | Unparted |
| B12 | Conventional Sample | 0.1 | 0.7 | Type 3 | Unparted |
| B13 | Conventional Sample | 0.2 | 0.2 | Type 3 | Unparted |
| B14 | Conventional Sample | 0.2 | 0.5 | Type 1 | Unparted |
| B15 | Conventional Sample | 0.2 | 0.7 | Type 2 | Unparted |
| B16 | Conventional Sample | 0.3 | 0.2 | Type 2 | Unparted |
| B17 | Conventional Sample | 0.3 | 0.5 | Type 2 | Unparted |
| B18 | Conventional Sample | 0.3 | 0.7 | Type 3 | Unparted |

Figure 4:
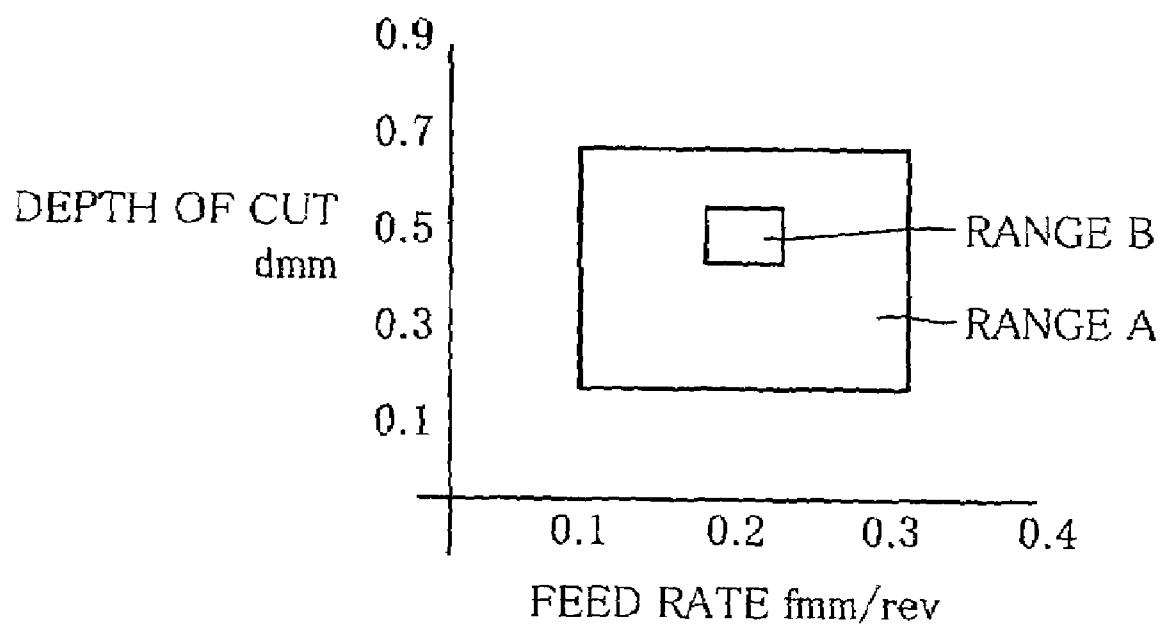
FIG. 4 is a graph showing a range for obtaining excellent results in experimental Example 1.

FIG. 4 is a graph showing the ranges of f and d obtaining excellent results in the aforementioned experiment. Ranges A and B in the figure show ranges (chip treatment ranges) for obtaining excellent chip states (at least type 5 according to chip classification under INFOS) and chip lengths of not more than 10 cm in the inventive and conventional samples (outer diameter working) respectively. As understood from this figure, it is recognized that the inventive samples are excellent in chip treatability over wide-ranging cutting conditions as to both of outer diameter working and end face working. On the other hand, the conventional samples are excellent in chip treatability only over narrow working conditions. More specifically, only A14 employed for outer diameter working attains an excellent chip treatment effect, while the remaining samples attain no excellent effects. Further, the case (B14) of performing end face working under the same conditions for that attaining excellent chip treatment effects in outer diameter working attains no excellent effect. In other words, the results of this experiment show that the inventive indexable insert is excellent in chip treatability as to wide-ranging working conditions.

(2) Experimental Example 2

Influence by θ

The following indexable inserts having various θ were employed for performing outer diameter working and end face working on SCM 415 carburized works under cutting conditions of V=120 m/min., d=0.5 mm and f=0.2 mm/rev. Chip states and chip lengths were obtained as to the respective indexable inserts, for evaluating chip treatability. Table 3 (outer diameter working) and Table 4 (end face working) show the results. The chip states are shown according to chip classification under INFOS.

Used Inserts: CNMA 120408

θ: shown in Tables 3 and 4. The apical angle α is 80°, and hence $6/10\times\alpha=48°$, $90-1/10\times\alpha=82°$, and the range of θ is 48° to 80°.

L1'/L1=1, L1/L2=0.5, Rz JIS 94=0.3 μm, the negative land angle is 25°, the negative land width is 0.1 mm, the breaker width is 0.4 mm, and the breaker height is 0.25 mm.

TABLE 3

Outer Diameter Working

| Run Number | θ (°) | Chip State | Chip Length (cm) |
|---|---|---|---|
| C1 | 42 | Type 2 | Unparted, tool failure on center of protrusion |
| C2 | 50 | Type 6 | 6 |
| C3 | 56 | Type 6 | 4 |
| C4 | 66 | Type 6 | 4 |
| C5 | 76 | Type 5 | 12 |
| C6 | 82 | Type 5 | 14 |
| C7 | 86 | Type 1 | Unparted |

TABLE 4

End Face Working

| Run Number | θ (°) | Chip State | Chip Length (cm) |
|---|---|---|---|
| D1 | 42 | Type 3 | Unparted |
| D2 | 50 | Type 6 | 5 |
| D3 | 56 | Type 6 | 4 |
| D4 | 66 | Type 6 | 4 |
| D5 | 76 | Type 6 | 4 |
| D6 | 82 | Type 5 | 10 |
| D7 | 86 | Type 3 | Unparted |

In the outer diameter working, the case C1 having θ smaller than 48° produced tangly chips, while the cases C2 to C6 having θ in the range of 48° to 82° produced regularly controlled curled chips. The case C7 having θ exceeding 82° produced flat chips, which in turn twined around the work to result in no chip treating effect. In the end face working, on the other hand, D2 to D6 having θ in the range of 48° to 82° produced regular spiral chips, which were properly parted with excellent chip treating effects. In D1 to D7 having θ out of the range of 48° to 82°, however, chips were not parted. These results prove that excellent chip treatability is attained when θ is in the range of $6/10\times\alpha\leqq\theta\leqq90-1/10\times\alpha$.

(3) Experimental Example 3

Influence by L1/L2

The following indexable inserts having various L1/L2 were employed for performing outer diameter working and end face working on SCM 415 carburized works under cutting conditions of V=120 m/min., d=0.5 mm and f=0.2 mm/rev. Chip states and chip lengths were obtained as to the respective indexable inserts, for evaluating chip treatability. Table 5 (outer diameter working) and Table 6 (end face working) show the results. The chip states are shown according to chip classification under INFOS.

Used Inserts: CNMA 120408

θ=60°, L1'/L1=1, L1/L2: shown in Tables 5 and 6.

Rz JIS 94=0.3 μm, the negative land angle is 25°, the negative land width is 0.1 mm, the breaker width is 0.4 mm, and the breaker height is 0.25 mm.

TABLE 5

Outer Diameter Working

| Run Number | L1/L2 | Chip State | Chip Length (cm) |
|---|---|---|---|
| E1 | 0.1 | Type 2 | Unparted |
| E2 | 0.2 | Type 6 | 8 |
| E3 | 0.4 | Type 6 | 8 |
| E4 | 0.6 | Type 6 | 5 |
| E5 | 0.8 | Type 7 | 3 |
| E6 | 0.9 | Type 1 | Unparted |

TABLE 6

End Face Working

| Run Number | L1/L2 | Chip State | Chip Length (cm) |
|---|---|---|---|
| F1 | 0.1 | Type 2 | Unparted |
| F2 | 0.2 | Type 6 | 8 |
| F3 | 0.4 | Type 6 | 5 |
| F4 | 0.6 | Type 6 | 5 |
| F5 | 0.8 | Type 7 | 3 |
| F6 | 0.9 | Type 1 | Unparted |

In both of the outer diameter working and the end face working, chips were regularly curled and parted into proper lengths without twining around the works to prove excellent chip treating effects when 0.2≦L1/L2≦0.8. When L1/L2=0.1 and 0.9, on the other hand, the samples produced flat chips, which in turn twined around the works to damage chip treatment effects. These results prove that excellent chip treatability is attained when L1/L2 is in the range of 0.2≦L1/L2≦0.8.

(4) Experimental Example 4

Influence by L1'/L1

The following indexable inserts having various L1'/L1 were employed for performing outer diameter working and end face working on SCM 415 carburized works under cutting conditions of V=120 m/min., d=0.5 mm and f=0.2 mm/rev. Chip states and chip lengths were obtained as to the respective indexable inserts, for evaluating chip treatability. Table 7 (outer diameter working) and Table 8 (end face working) show the results. The chip states are shown according to chip classification under INFOS.

Used Inserts: CNMA 120408

θ=60°, L1'/L1: Tables 7 and 8. L1/L2=0.5, Rz JIS 94=0.3 μm, the negative land angle is 25°, the negative land width is 0.1 mm, the breaker width is 0.4 mm, and the breaker height is 0.25 mm.

TABLE 7

| Outer Diameter Working | | | |
|---|---|---|---|
| Run Number | L1'/L1 | Chip State | Chip Length (cm) |
| G1 | 0.8 | Type 5 | 10 |
| G2 | 0.9 | Type 6 | 5 |
| G3 | 1.0 | Type 6 | 5 |
| G4 | 1.1 | Type 6 | 5 |
| G5 | 1.2 | Type 5 | 10 |

TABLE 8

| End Face Working | | | |
|---|---|---|---|
| Run Number | L1'/L1 | Chip State | Chip Length (cm) |
| H1 | 0.8 | Type 5 | 10 |
| H2 | 0.9 | Type 6 | 5 |
| H3 | 1.0 | Type 6 | 5 |
| H4 | 1.1 | Type 6 | 5 |
| H5 | 1.2 | Type 5 | 10 |

In both of the outer diameter working and the end face working, chips were regularly curled and parted into proper lengths without twining around the works to prove excellent chip treating effects when 0.9≦L1'/L1≦1.1. When L1'/L1<0.9 and L1'/L1>1.1, on the other hand, relatively long chips were obtained in the end face working. These results prove that excellent chip treatability is attained in both outer diameter working and end face working when L1'/L1 is in the range of 0.9≦L1'/L1≦1.1.

(5) Experimental Example 5

Influence by Surface Roughness of Land Part

The following indexable inserts provided with land parts (also including negative land parts adjacent to land parts in this Experimental Example) having various surface roughness values (Rz JIS 94) were employed for performing outer diameter working on SCM 415 carburized works under cutting conditions of V=120 m/min., d=0.5 mm and f=0.2 mm/rev. Chip states (chip classification and chip lengths: this also applies to the following) in initial cutting stages, chip states observed when the cutting lengths reached 3 km and chip states observed when the cutting lengths reached 5 km were obtained as to the respective indexable inserts, for evaluating chip treatability. Table 9 shows the results. The chip states in Table 9 are according to chip classification under INFOS.

Used Inserts: CNMA 120408

θ=60°, L1'/L1=1, L1/L2=0.5, Rz JIS 94: shown in Table 9. The negative land angle is 25°, the negative land width is 0.1 mm, the breaker width is 0.4 mm, and the breaker height is 0.25 mm.

TABLE 9

| | | Initial State | | Length of Cut 3 km | | Length of Cut 5 km | |
|---|---|---|---|---|---|---|---|
| Run Number | RzJIS94 μm | Chip Classification | Chip Length | Chip Classification | Chip Length | Chip Classification | Chip Length |
| I1 | 0.1 | Type 7 | 4 cm | Type 7 | 4 cm | Type 6 | 5 cm |
| I2 | 0.2 | Type 7 | 4 cm | Type 7 | 4 cm | Type 6 | 5 cm |
| I3 | 0.3 | Type 7 | 4 cm | Type 7 | 4 cm | Type 6 | 5 cm |
| I4 | 0.4 | Type 7 | 4 cm | Type 7 | 4 cm | Type 6 | 5 cm |
| I5 | 0.45 | Type 7 | 4 cm | Type 7 | 4 cm | Type 5 | 5 cm |
| I6 | 0.49 | Type 7 | 4 cm | Type 6 | 5 cm | Type 5 | 8 cm |
| I7 | 0.5 | Type 7 | 4 cm | Type 5 | 8 cm | Type 4 | 12 cm |
| I8 | 0.7 | Type 7 | 4 cm | Type 5 | 10 cm | Type 4 | 15 cm |
| I9 | 2 | Type 7 | 4 cm | Type 5 | 10 cm | Type 4 | 15 cm |

As understood from the results shown in Table 9, chip states in the initial stages were excellent in all samples. However, the cases I1 to I6 provided with the land parts having the surface roughness values of less than 0.5 μm maintained the initial excellent chip states regardless of the cutting lengths. On the other hand, I7 to I9 showing excellent chip states in the initial stages exhibited such tendencies that the chip states varied with the cutting lengths to increase the chip lengths. However, the long chips did not twine around the works or holders.

The results shown in Table 9 prove that initial chip states are equivalent to each other whether the surface roughness values of the land parts are at least or less than 0.5 μm while the initial excellent chip treatability is maintained when the surface roughness values are less than 0.5 μm. Therefore, the surface roughness of the tool rake face is conceivably desirably less than 0.5 μm.

(6) Experimental Example 6

Influence by Angle of Negative Land Formed on Cutting Edge of Tool

The following indexable inserts having various negative land angles were employed for performing outer diameter working on SCM 415 carburized works under cutting conditions of V=120 m/min., d=0.5 mm and f=0.2 mm/rev. As to each indexable insert, the diameter of the work after working 30 workpieces and the number of workpieces before tool failure were obtained. Table 10 shows the results.

Used Inserts: CNMA 120408

θ=60°, L1/L2=0.5, Rz JIS 94=0.3 μm, the negative land angle: shown in Table 10. The negative land width is 0.1 mm, the breaker width is 0.4 mm, and the breaker height is 0.25 mm.

TABLE 10

| Run Number | Negative Land Angle (°) | Work Diameter after Working 30 Materials (μm) | Number of Workpieces before Tool Failure |
|---|---|---|---|
| J1 | 0 | — | 15 |
| J2 | 10 | 50.005 | 33 |
| J3 | 15 | 50.008 | 75 |
| J4 | 20 | 50.013 | 85 |
| J5 | 30 | 50.013 | 101 |
| J6 | 40 | 50.015 | 105 |
| J7 | 45 | 50.018 | 103 |
| J8 | 50 | 50.023 | 99 |

As obvious from the results shown in Table 10, the cutting edge of J1 provided with no negative land caused tool failure in the earliest stage in the comparison test. J2, which exhibited the most excellent dimension after working 30 workpieces, caused tool failure in an earlier stage as compared with the remaining tools. When the negative land angle is increased, on the other hand, tool failure is hardly caused and there is a tendency toward a long life. When the negative land angle exceeded 45° and reached 50°, however, the number of workpieces was reduced due to increased cutting resistance. When the negative land angle was further increased, dimensional accuracy of the work was so reduced that it was difficult to satisfy even dimensional accuracy of 50 mm±0.025 mm required to the outer diameter of the work.

In J3 to J7 having the negative land angles in the range of 15° to 45°, on the other hand, it was possible to obtain stable diameters of works with no tool failure on cutting edges, to result in long lives. These results prove that further excellent cutting performance can be attained when the angle of the negative land on the cutting edge of the tool is in the range of 15° to 45°. In this experiment, all tools exhibited excellent chip treatability with no problem.

(7) Experimental Example 7

Influence by Width of Negative Land Formed on Cutting Edge of Tool

The following indexable inserts having various negative land widths were employed for performing outer diameter working on SCM 415 carburized works under cutting conditions of V=120 m/min., d=0.5 mm and f=0.2 mm/rev. As to each indexable insert, the diameter of the work after working 30 workpieces and the number of workpieces before tool failure were obtained. Table 11 shows the results.

Used Inserts: CNMA 120408

θ=60°, L1'/L1=1, L1/L2=0.5, Rz JIS 94=0.3 μm, the negative land angle is 25°, and the negative land width: shown in Table 11. The breaker width is 0.4 mm, and the breaker height is 0.25 mm.

TABLE 11

| Run Number | Negative Land Width (mm) | Work Diameter after Working 30 Materials (μm) | Number of Workpieces before Tool Failure |
|---|---|---|---|
| K1 | 0 | — | 15 |
| K2 | 0.02 | 50.005 | 80 |
| K3 | 0.12 | 50.012 | 100 |
| K4 | 0.18 | 50.015 | 105 |
| K5 | 0.36 | 50.023 | 119 |

As obvious from the results shown in Table 11, the cutting edge of K1 provided with no negative land caused tool failure in the earliest stage. On the other hand, K5 having a large negative land width was increased in cutting resistance due to the large negative land width to exhibit the lowest dimensional accuracy of the work in the comparison test although this sample most hardly caused tool failure and attained a long life.

In K2 to K4, on the other hand, it was possible to obtain stable diameters of the works with no tool failure on cutting edges, to result in long lives. These results prove that further excellent cutting performance is attained when the width of the negative land on the cutting edge of the tool is in the range of 0.02 mm to 0.2 mm. In this test, all tools exhibited excellent chip treatability with no problem.

(8) Experimental Example 8

Influence by Shear Angle (Rake Angle) of Land Part

The following indexable inserts provided with land parts having various shear angles (on bisectors for apical angles of cutting edges) were employed for performing outer diameter working on SCM 415 carburized works under cutting conditions of V 120 m/min., d=0.5 mm and f=0.2 mm/rev. As to each indexable insert, the diameter of the work after working 30 workpieces and the number of workpieces before tool failure were obtained. Table 12 shows the results.

Used Inserts: CNMA 120408

θ=60°, L1'/L1=1, L1/L2=0.5, Rz JIS 94=0.3 μm, the negative land angle is 25°, the negative land width is 0.1 mm, the breaker width is 0.4 mm, and the breaker height is 0.25 mm.

TABLE 12

| Run Number | Rake Angle ° | Work Diameter after Working 30 Materials (μm) | Number of Workpieces before Tool Failure |
|---|---|---|---|
| L1 | +0 | 50.013 | 89 |
| L2 | +10 | 50.008 | 63 |
| L3 | +20 | 50.005 | 35 |
| L4 | +30 | — | 28 |

As obvious from the results shown in Table 12, the cutting edge of L4 having a large rake angle caused tool failure in the earliest stage in the comparison test. L3, exhibiting the most excellent dimension after working 30 workpieces, caused tool failure in an earlier stage as compared with the remaining samples. When the rake angle is reduced, tool failure is hardly caused and there is a tendency toward a long life. Particularly in L1 having the rake angle of 0°, it was possible to obtain a stable diameter of the work with no tool failure on the cutting edge, to result in a long life. These results prove that further excellent cutting performance is attained when the shear angle of the land part is set to 0° with no formation of a breaker groove. In this test, all tools exhibited excellent chip treatability with no problem.

(9) Experimental Example 9

Influence by Coating Layer on Cutting Edge of Tool

Influence exerted by a coating layer formed on the surface of a superhard sintered body containing cubic boron nitride by sputtering was investigated. The following indexable inserts were employed, and coating layers were formed on the surfaces of superhard sintered bodies. Referring to Table 11, M1 denotes an indexable insert provided with no coating layer, M2 denotes an indexable insert provided with a coating layer of TiN having a thickness of 2 μm formed by PVD, M3 denotes an indexable insert provided with a coating layer of TiAlN having a thickness of 2 μm formed by PVD and M4 denotes an indexable insert provided with a coating layer of TiCN having a thickness of 2 μm formed by PVD. These indexable inserts were employed for performing outer diameter working on SCM 415 carburized works under cutting conditions of V=120 m/min., d=0.5 mm and f=0.2 mm/rev. Chip states (chip classification and chip lengths: this also applies to the following) in initial cutting stages, chip states observed when the cutting lengths reached 5 km and chip states observed when the cutting lengths reached 8 km were obtained as to the respective indexable inserts, for evaluating chip treatability. Table 13 shows the results. Chip classification in Table 13 is according to chip classification under INFOS.

Used Inserts: CNMA 120408

θ=60°, L1'/L1=1, L1/L2=0.5, the negative land angle is 25°, the negative land width is 0.1 mm, the breaker width is 0.4 mm, and the breaker height is 0.25 mm.

TABLE 13

| | | Initial Chip State | | Chip State After Cutting 5 km | | Chip State After Cutting 8 km | |
|---|---|---|---|---|---|---|---|
| Run Number | Coating layer | Chip Classification | Chip Length | Chip Classification | Chip Length | Chip Classification | Chip Length |
| M1 | none | Type 7 | 3 cm | Type 6 | 8 cm | Type 6 | 10 cm |
| M2 | TiN | Type 7 | 3 cm | Type 7 | 5 cm | Type 6 | 7 cm |
| M3 | TiAlN | Type 7 | 3 cm | Type 7 | 5 cm | Type 6 | 7 cm |
| M4 | TiCN | Type 7 | 3 cm | Type 7 | 5 cm | Type 6 | 7 cm |

The results prove that all indexable inserts exhibited excellent chip states in initial states with tendencies toward longer chip states in proportion to cutting lengths. Comparing the indexable inserts provided with the coating layers and the indexable insert provided with no coating layer with each other, the indexable inserts provided with the coating layers were capable of suppressing tool shape changes and maintaining excellent initial chip states due to the effects of the coating layers. Chips increased in length did not twine around the works or holders.

(10) Experimental Example 10

Influence by Surface Roughness of Land Part Formed with Film

The following indexable inserts provided with land parts (also including negative land parts adjacent to land parts in this Experimental Example) having various surface roughness values (Rz JIS 94) in a case of forming film layers on superhard sintered bodies were employed for performing outer diameter working on SCM 415 carburized works under cutting conditions of V=120 m/min., d=0.5 mm and f=0.2 mm/rev. Chip states (chip classification and chip lengths: this also applies to the following) in initial cutting stages, chip states observed when the cutting lengths reached 3 km and chip states observed when the cutting lengths reached 5 km were obtained as to the respective indexable inserts, for evaluating chip treatability. Table 14 shows the results. Chip classification in Table 14 is according to chip classification under INFOS.

Used Inserts: CNMA 120408

θ=60°, L1'/L1=1, L1/L2=0.5, Rz JIS 94: shown in Table 14. The negative land angle is 25°, the negative land width is 0.1 mm, the breaker width is 0.4 mm, and the breaker height is 0.25 mm.

TABLE 14

| | | Initial State | | Length of Cut 3 km | | Length of Cut 5 km | |
|---|---|---|---|---|---|---|---|
| Run Number | RzJIS94 μm | Chip Classification | Chip Length | Chip Classification | Chip Length | Chip Classification | Chip Length |
| N1 | 0.1 | Type 7 | 4 cm | Type 7 | 4 cm | Type 6 | 5 cm |
| N2 | 0.2 | Type 7 | 4 cm | Type 7 | 4 cm | Type 6 | 5 cm |
| N3 | 0.4 | Type 7 | 4 cm | Type 7 | 4 cm | Type 6 | 5 cm |
| N4 | 0.6 | Type 7 | 4 cm | Type 7 | 4 cm | Type 6 | 5 cm |
| N5 | 0.80 | Type 7 | 4 cm | Type 7 | 4 cm | Type 5 | 5 cm |
| N6 | 0.9 | Type 7 | 4 cm | Type 6 | 4 cm | Type 5 | 6 cm |
| N7 | 1.0 | Type 7 | 4 cm | Type 5 | 5 cm | Type 4 | 8 cm |
| N8 | 1.1 | Type 7 | 4 cm | Type 5 | 8 cm | Type 4 | 12 cm |
| N9 | 2 | Type 7 | 4 cm | Type 5 | 9 cm | Type 4 | 15 cm |

As understood from the results shown in Table 14, chip states in the initial stages were excellent in all indexable inserts. The cases N1 to N7 provided with the land parts having the surface roughness values of not more than 1.0 μm maintained the initial excellent chip states regardless of the cutting lengths. On the other hand, N8 to N9 showing excellent chip states in the initial stages exhibited such tendencies that the chip states varied with the cutting lengths to increase the chip lengths. However, the long chips did not twine around the works or holders.

The results shown in Table 14 prove that initial chip states are equivalent to each other whether the surface roughness values of the land parts covering the surfaces of the superhard sintered bodies are at least or less than 1.0 μm while the initial excellent chip treatability is maintained when the surface roughness values are not more than 1.0 μm. Therefore, the surface roughness of the tool rake face covering the surface of the superhard sintered body is conceivably desirably not more than 1.0 μm.

While the embodiments and Examples of the present invention have been described as above, proper combinations of the features of the respective embodiments and Examples are planned from the first. Further, the embodiments and Examples disclosed this time must be considered as illustrative and not restrictive in all points. The range of the present invention is shown by the scope of claim for patent, and it is intended that all modifications within the meaning and range equivalent to the scope of claim for patent are included.

INDUSTRIAL APPLICABILITY

The present invention is effectively applicable to an indexable insert.

The invention claimed is:

1. An indexable insert prepared by bonding a superhard sintered body containing cubic boron nitride to at least the upper surface of an apical angle part of a tool body having a polygonal shape in top view and forming an edge and a chip breaker on said superhard sintered body, wherein a chamfer is formed on the intersection between the upper surface and the side surface of said superhard sintered body, said chip breaker has a substantially symmetrical shape with respect to a section bisecting the apical angle of said apical angle part, and has a protrusion and a flat part provided between said protrusion and said apical angle part, a pair of ridges reaching said chamfer, the pair of ridges are on the apex of said protrusion and are linear or arcuate, $\theta$ is in the range of $6/10\times\alpha\leqq\theta\leqq90-1/10\times\alpha$ assuming that $\theta$ represents an angle formed by the linear ridges of said protrusion or a tangential line for said arcuate ridges at a point bisecting the arcuate ridges of said protrusion and a bisector for said apical angle and $\alpha$ represents said apical angle, and a line segmental ratio is in the range of $0.9\leqq L1'/L1\leqq1.1$ assuming that L1 represents the length of a line segment connecting a first intersection between said pair of ridges on the apex of said protrusion and an extreme point of first said ridge and L1' represents the length of a line segment connecting an extreme point of second said ridge and said first intersection, and $0.2\leqq L1/L2$ 0.8 assuming that L2 represents the length of a line segment connecting a second intersection between a straight line passing through the extreme point of said first ridge from said first intersection and the outer periphery of said tool body and said first intersection.

2. The indexable insert according to claim 1, wherein the surface roughness of said flat part of the superhard sintered body and said chamfer adjacent to said flat part is at least 0.1 μm and less than 0.5 μm in ten point height of irregularities (Rz JIS 94).

3. The indexable insert according to claim 1, wherein an angle formed by said chamfer and the upper surface of said tool body is in the range of at least 15° and not more than 45°.

4. The indexable insert according to claim 1, wherein the width of said chamfer on the forward end of said apical angle part is in the range of at least 0.02 mm and not more than 0.2 mm in top view.

5. The indexable insert according to claim 1, wherein the distance between the forward end of said apical angle part and said first intersection is in the range of at least 0.1 mm and not more than 2 mm in top view.

6. The indexable insert according to claim 1, wherein the difference between the heights of the forward end of said apical angle part and said first intersection is in the range of at least 0.02 mm and not more than 0.5 mm.

7. The indexable insert according to claim 1, wherein the shear angle of said flat part is 0°.

8. The indexable insert according to claim 1, wherein a coating layer consisting of at least one element selected from a group consisting of the elements belonging to the groups 4a, 5a and 6a of the periodic table, Al, Si and B, a nitride, a carbide or an oxide of at least one metal selected from said group or a solid solution thereof is formed on the surface of said superhard sintered body.

9. The indexable insert according to claim 1, wherein the surface roughness of said flat part of said superhard sintered body formed with a coating layer on the surface thereof and said chamfer adjacent to said flat part is at least 0.1 μm and not more than 1.0 μm in ten point height of irregularities (Rz JIS 94).

* * * * *